United States Patent
Challapalli et al.

(10) Patent No.: US 7,020,648 B2
(45) Date of Patent: Mar. 28, 2006

(54) SYSTEM AND METHOD FOR IDENTIFYING AND UTILIZING A SECONDARY INDEX TO ACCESS A DATABASE USING A MANAGEMENT SYSTEM WITHOUT AN INTERNAL CATALOGUE OF ONLINE METADATA

(75) Inventors: Kiran Challapalli, San Jose, CA (US); Kyle Jeffrey Charlet, Morgan Hill, CA (US); Douglas Michael Frederick Hembry, Los Gatos, CA (US); Christopher M. Holtz, San Jose, CA (US); Robert Daniel Love, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 10/319,941

(22) Filed: Dec. 14, 2002

(65) Prior Publication Data
US 2004/0117351 A1   Jun. 17, 2004

(51) Int. Cl.
*G06F 17/30* (2006.01)

(52) U.S. Cl. .................... 707/2; 707/4; 707/5; 707/10; 707/101

(58) Field of Classification Search ............... 707/3–5, 707/10, 100–101
See application file for complete search history.

(56) References Cited

U.S. PATENT DOCUMENTS

| | | | |
|---|---|---|---|
| 5,884,304 A | 3/1999 | Davis, III et al. | 707/4 |
| 6,128,619 A | 10/2000 | Fogarasi et al. | 707/102 |
| 6,202,069 B1 | 3/2001 | Blackman et al. | 707/103 |
| 6,253,200 B1 * | 6/2001 | Smedley et al. | 707/4 |
| 6,304,867 B1 | 10/2001 | Schmidt | 707/2 |
| 6,370,537 B1 | 4/2002 | Gilbert et al. | 707/101 |
| 6,418,443 B1 | 7/2002 | Martin, Jr. | 707/101 |
| 6,708,164 B1 * | 3/2004 | Cseri et al. | 707/4 |
| 6,845,376 B1 * | 1/2005 | Johnson | 707/100 |
| 6,853,997 B1 * | 2/2005 | Wotring et al. | 707/100 |
| 6,879,986 B1 * | 4/2005 | Fisher | 707/101 |

OTHER PUBLICATIONS

Meng et al., "Processing hierarchical queries in heterogeneous environment", Data Engineering, 1992. Proceedings. Eighth International Conference on Publication Date: Feb. 2-3, 1992, On page(s): 394-401.*

(Continued)

*Primary Examiner*—Khanh Pham
(74) *Attorney, Agent, or Firm*—Samuel A. Kassatly

(57) ABSTRACT

A system for identifying and utilizing a secondary index to access a database using a management system without an internal catalogue of online metadata. The system receives an application request to access a database from the application program, and parses the application request to determine at least one column name and at least one table name. The system utilizes an online catalogue containing metadata to translate the column name to a field name and the table name to a segment name, wherein the segment name has an associated secondary index. The system utilizes the online catalogue to determine an associated secondary index name, and builds a database request that includes the segment name, the field name, and the associated secondary index name. The system then sends the database request to the database management system, so that the associated secondary index can be used by the database management system in response to the database request.

9 Claims, 4 Drawing Sheets

OTHER PUBLICATIONS

Ching et al., "A relational query language interface to a hierarchical database management system", Data and Knowledge Systems for Manufacturing and Engineering, 1989., Second International Conference on Oct. 16-18, 1989 Page(s): 105-112.*

Meier et al., "Hierarchical to relational database migration", Software, IEEE Publication Date: May 1994 □□vol.: 11 , Issue: 3, On page(s): 21-27.*

Chung et al., "Access to indexed hierarchical databases using a relational query language" Knowledge and Data Engineering, IEEE Transactions on, vol. 5, Issue 1, Feb. 1993 Page(s):155-161.*

* cited by examiner

SYSTEM AND METHOD FOR IDENTIFYING AND UTILIZING A SECONDARY INDEX TO ACCESS A DATABASE USING A MANAGEMENT SYSTEM WITHOUT AN INTERNAL CATALOGUE OF ONLINE METADATA

FIELD OF THE INVENTION

The present invention generally relates to database management systems, and particularly to a method for providing online catalogue capability to database management systems without online catalogues in a manner that can accommodate secondary indexes. More specifically, this invention provides capability for interaction with application programming interfaces such as JDBC®, so that application programs written in programming languages such as Java® can access hierarchical databases utilizing secondary indexes to achieve improved performance.

BACKGROUND OF THE INVENTION

Physical information management system (IMS) databases are hierarchical, non-relational databases. Each database has a schema defined as a hierarchy or tree of segment types, each of which is defined, in turn, as a collection of fields. This definition of a physical database schema is contained in an IMS control block called a database description (DBD). One or more optional secondary indexes may also be defined for an IMS hierarchical database each of which is defined with their own unique DBD control blocks. Online catalogues in the prior art capture available information from the primary database DBD but otherwise ignore all other related DBDs associated with defined secondary indexes. Consequently, this secondary index metadata is only available in assembler language macro format, or as compiled object code, and thus the IMS has no online catalogue capability pertaining to secondary indexes.

Users operating IMS databases may wish to query and manipulate the data contained in the database. Current methods for accessing and manipulating the data in databases often use an application programming interface (API) written in Java®, such as JDBC® (Java® DataBase Connectivity). JDBC® is a programming interface that lets Java® applications access a database via the SQL language.

Since Java® interpreters (Java® Virtual Machines) are available for major client platforms, this allows a platform-independent database application to be written. However, JDBC® cannot be used with prior art IMS to access a database using a secondary index because the prior art online catalogue cannot accommodate secondary indexes. The catalogue defines all the attributes of the segments, fields and their inter-relationships. Segments and fields in a hierarchical database are analogous to tables and columns within relational databases. A catalogue is online if it can be accessed dynamically (during execution of the application) at runtime.

A database with an online catalogue will access the online catalogue and perform maintenance functions when data is retrieved or stored. Such maintenance functions include strong type checking which ensures type consistency and eliminates type conflict. JDBC® also requires strong type checking. Consequently, JDBC® cannot be used with IMS databases when access to the data is through a secondary index to achieve enhanced performance. Therefore, in the prior art, applications requiring dynamic access to IMS metadata must forego the use of secondary indexes and incur significant performance penalties.

What is therefore needed is an online catalogue that can be introduced in an IMS setting, or in any other hierarchical database setting that has no online catalogue, to facilitate the use of secondary indexes for accessing the data in a more efficient manner. The need for such a system has heretofore remained unsatisfied.

SUMMARY OF THE INVENTION

The present invention satisfies this need, and presents a system and associated method (collectively referred to herein as "the system" or "the present system") for identifying and utilizing a secondary index to access a database using a management system without an internal catalogue of online metadata.

A secondary index provides alternate search paths to any segment type in the database hierarchy (logical or physical), and affects the application programming interface's view of the data. Each secondary index represents an access path to the database record other than via the root key. The additional access path is a new relationship that can result in faster retrieval of data.

The present system receives an application request to access the database from the application program, and parses the application request to determine at least one column name and at least one table name. The system utilizes an online catalogue containing metadata to translate the column name to a field name and the table name to a segment name, wherein the segment name has an associated secondary index.

The system utilizes the online catalogue to determine an associated secondary index name, and builds a database request that includes the segment name, the field name, and the associated secondary index name. The system then sends the database request to the database management system, so that the associated secondary index can be used by the database management system in response to the database request.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

API: (Application Program Interface) A language and message format used by an application program to communicate with the operating system or some other system or control program such as a database management system (DBMS) or communications protocol.

Catalogue (or catalog): Defines attributes, including IMS metadata. Exemplary attributes include the attributes of the tables and columns within databases.

Class: In object-oriented programming, an object type; a group of objects that have the same properties, operations, and behavior.

Database systems, also referred to as Database Management System (DBMS): Software used to manage databases. Generally provides services by which applications can access and manipulate the data in the databases under its control, and other services for the administration, security, and integrity of the databases.

Dynamically: during the execution of an application.

Metadata: Data about data. Metadata is definitional data that provides documentation of or information about other data managed within an environment or by an application. Metadata may document data about data elements or attributes such as name, size, or data type. It may also log data about data structures including length, fields, and columns. Other data included in Metadata encompass the association, storage location, and ownership of data. Metadata may additionally include descriptive information about the context, quality and condition, and/or characteristics of data.

Online catalogue: A catalogue that is dynamically accessible at runtime during execution of the application.

Schema: A structure of hierarchical or relational databases. For example, the schema of a relational database is comprised of tables with columns, indexes, constraints, and relationships to other tables.

Segment: A partition, reserved area, partial component or piece of a larger structure.

Tree: A hierarchical structure which is made up by nodes. Nodes are connected by edges from one node (parent) to another (child). A single node at apex of the tree is known as the root node, while the terminus of a path in the opposite direction is a leaf.

Figure 1:
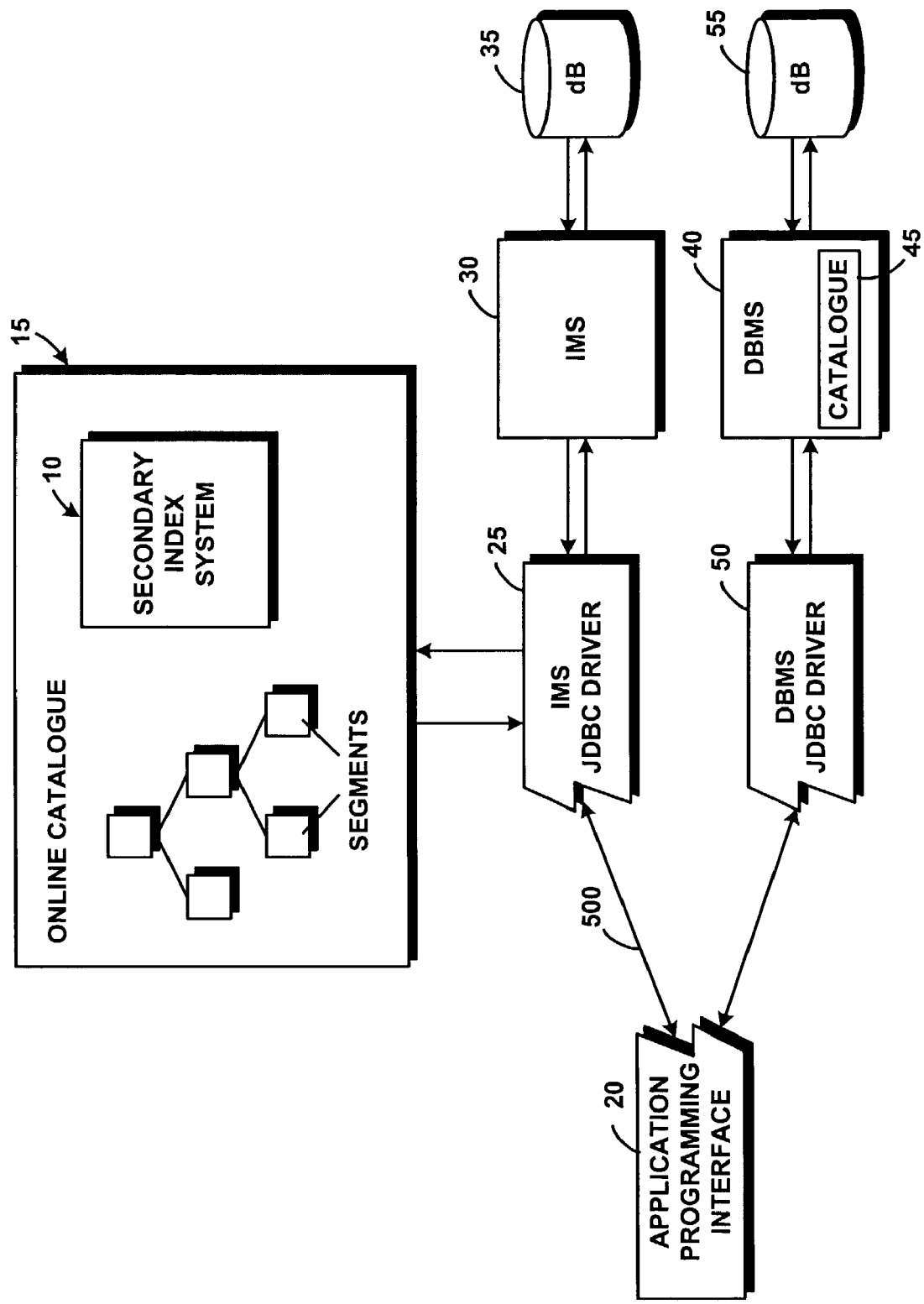
FIG. 1 is a schematic illustration of an exemplary operating environment in which a system and method for providing a secondary index within an online catalogue can be used according to the present invention.

FIG. 1 portrays an exemplary overall environment in which a system 10 and associated method may be used to access a database comprising user data and a secondary index from an application program utilizing an information management system without an internal catalogue of online metadata. More specifically, system 10 contains secondary index metadata, and may be used to provide capability for interaction with application programming interfaces such as JDBC®, so that application programs written in programming languages such as Java®, can access information stored in an information management system (IMS) utilizing one or more secondary indexes for more efficient access to data.

System 10 includes a software programming code or computer program product that is typically embedded within, or installed on a computer. Alternatively, system 10 can be saved on a suitable storage medium such as a diskette, a CD, a hard drive, or like devices. In a preferred embodiment, system 10 is an integral extension of the online catalogue. The entire catalogue 15 can be saved on a suitable storage medium.

System 10 is imbedded in an online catalogue 15 that uses known or available technology. In an exemplary preferred embodiment, a JDBC® application program 20 queries an information management system (IMS) JDBC® driver 25. The IMS JDBC® driver 25 interacts with online catalogue 15 to formulate queries for an information management system (IMS) 30. The information management system 30 retrieves the responses to these queries from database 35.

A database management system (DBMS) 40 is also shown for comparison, and includes an internal catalogue 45. The JDBC® application program 20 queries the database management system JDBC® driver 50. The database management system JDBC® driver 50 queries the DBMS 40 that then retrieves responses to these queries from database 55.

Although the online catalogue 15 including system 10, is not part of the database management system, IMS, its performance is similar to that of database management system 40. The database management system JDBC® driver 50 communicates with database management system 40 using SQL.

In contrast, the information management system JDBC® driver 25 parses the query from the JDBC® application program 20, and interacts with the online catalogue 15 with system 10 to form segment search arguments.

The information management system 30 has a schema defined as a hierarchy or tree of segment types, each of which is defined, in turn, as a collection of fields. This definition of a physical database schema is contained in control block called a "Database Description" (DBD). System 10 facilitates alternate search paths to any segment type in the database hierarchy (logical or physical), representing a different access path to the database record other than via the root key.

Figure 2:
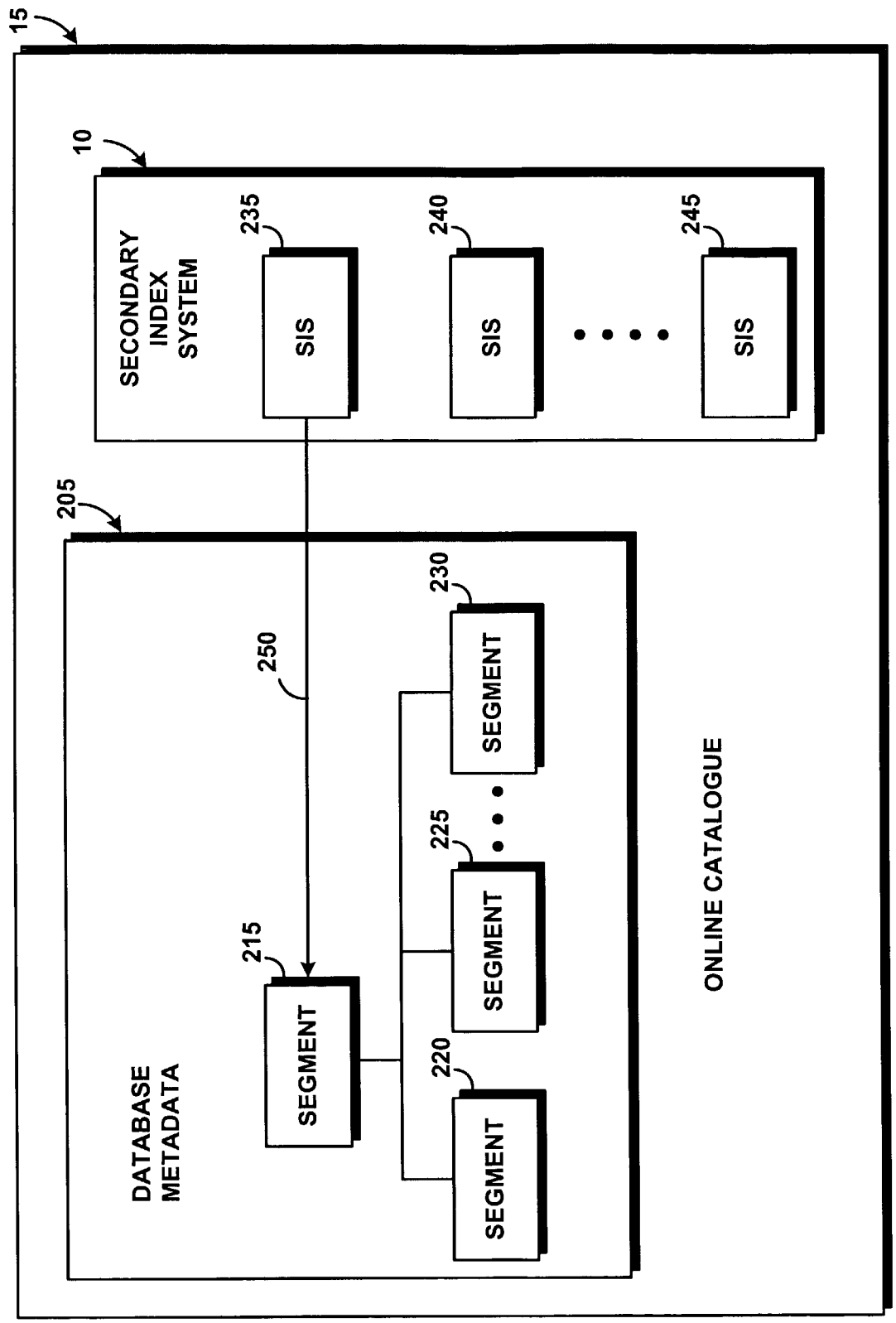
FIG. 2 is a block diagram of a high-level architecture of the secondary index and online catalogue system of FIG. 1.

With reference to FIG. 2, the online catalogue 15 contains metadata 205 for database 35. The secondary index system 10 of online catalogue 15 comprises additional metadata extracted from the secondary index DBDs. The online catalog 15 contains all the information representing the database hierarchy of the information management system 30 in a format that can be referenced at runtime.

The database hierarchy includes all the segments in the database, shown as segment 215, 220, 225, 230, and all the fields in the database segments. Information about the fields in the segments includes types of fields and the offsets and lengths of those fields.

The secondary index system contains secondary index segments (SIS), such as secondary index segment 235, 240, 245 that point to segments in the physical database 35, shown by link 250. This link 250 from secondary index segment 235 to segment 215 represents an alternate search path to segment 215

The JDBC driver 25 (FIG. 1) inspects the online catalogue 15 at runtime. The view of the main physical database 205 by the online catalogue 15 is modified to include this alternate search path (represented by link 250), so that the online catalogue 15 can accommodate requests from IMS JDBC Driver 25 referencing secondary indexes.

The segment 215 contains "key" values that define a key for the secondary index segment 235. The segment 215 contains fields in a segment, which define a key for the secondary index segment. The two main classes involved in system 10 are SecondaryIndexInfo and DLITypeInfo. A SecondaryIndexInfo object is a specialization of a DLITypeInfo object that defines a field, or a set of fields, that make up secondary index segment 235, 240, 245.

A SecondaryIndexInfo object is constructed by providing the field name alias, an array of ordered strings that indicate the field names (by field name alias), the secondary index references (via the SRCH parameter), and the actual name of the secondary index segment 235, 240, 245 as defined in the DBD.

A DLITypeInfo object is used to provide the layout of the fields in segment 215, 220, 225, 230 to the base class DLISegment. With this metadata, the DLISegment class is able to provide access to all of the fields in any segment 215, 220, 225, 230. This access is achieved using either the defined field name or the 1-based index of the DLITypeInfo object in the array that is registered for each segment type. The defined field name can be an alias for the defined search field name in the DBD source file. When referring to the field, the field alias can be used instead of the search or key field name.

The following code illustrates an exemplary way for defining a segment containing a secondary index:

```
public class TelephoneDirectory extends DLISegment {
    static String[] keys = {"LastName", "FirstName"};
    static DLITypeInfo[] typeInfo = {
        new DLITypeInfo("EmployeeNumber",  DLITypeInfo.CHAR,   1, 6, "EMPNO"),
        new DLITypeInfo("LastName",        DLITypeInfo.CHAR,   7, 10),
        new DLITypeInfo("FirstName",       DLITypeInfo.CHAR,   17, 10, "FNAME"),
        new DLITypeInfo("Extension",       DLITypeInfo.CHAR,   27, 10),
        new SecondaryIndexInfo("EmployeeInfo", "Directory", keys, "EMPINFO", 20)
    };
    public TelephoneDirectory( ) {
        super("Directory", "TELEDIR", typeInfo, 36);
    }
}
```

Figure 3:
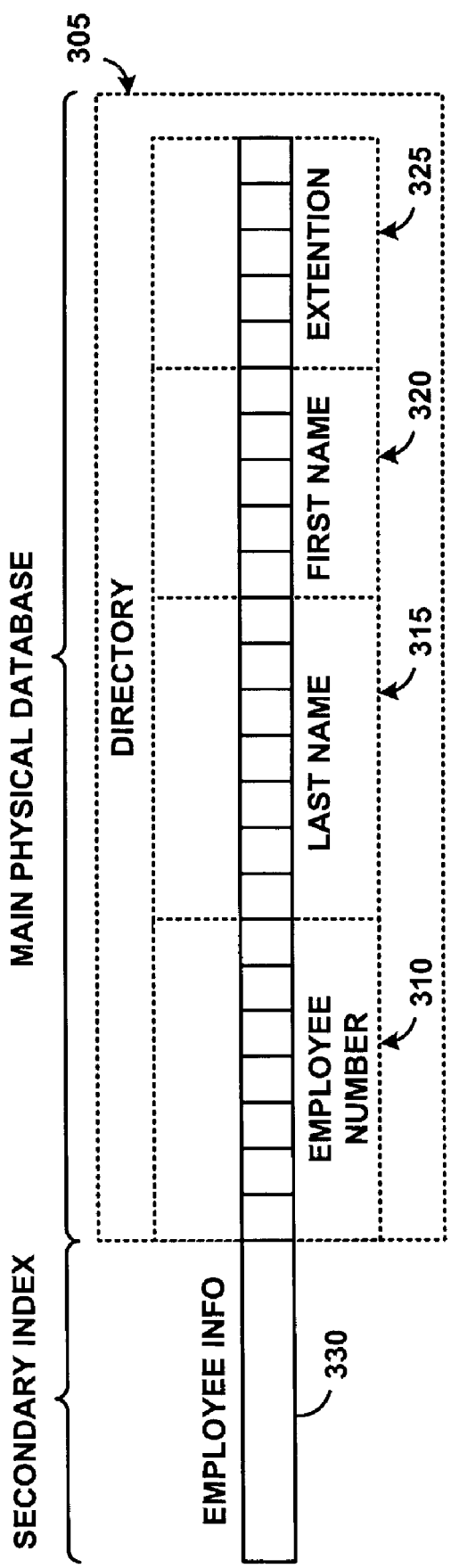
FIG. 3 is a segment example showing the secondary index and online catalogue system of FIGS. 1 and 2.

An example of a segment in the main physical database 205 is shown in FIG. 3. In this example, the segment 305 is named "directory". Segment 305 comprises four fields, employee number 310, last name 315, first name 320, and extension 325.

In this example, the secondary index segment 330 is keyed off the employee number 310 and the last name 315. The secondary index segment 330 is named "employee_info". The IMS JDBC® driver 25 parses the query from the JDBC® application program 20. If any field in the parsed query refers to "employee_info", an alternate path is requested to the specific segment sought by the JDBC® application program 20

Secondary index segment 330 points to two keys in segment 305. From these two keys, the IMS 30 can find the correct segment in the database 35 and retrieve the data associated with the two key fields in dB35. In this case, system 10 provides sufficient information about segments, fields, secondary indexes and relationships to allow JDBC driver 25 to construct an SSA for accessing that particular segment in information management system 30 utilizing the secondary index named "employee_info". Indexed access implies faster access to data.

In a preferred embodiment, and as shown in the example of FIG. 3, the secondary index segment 330 can be viewed as another field in segment 305.

Figure 4:
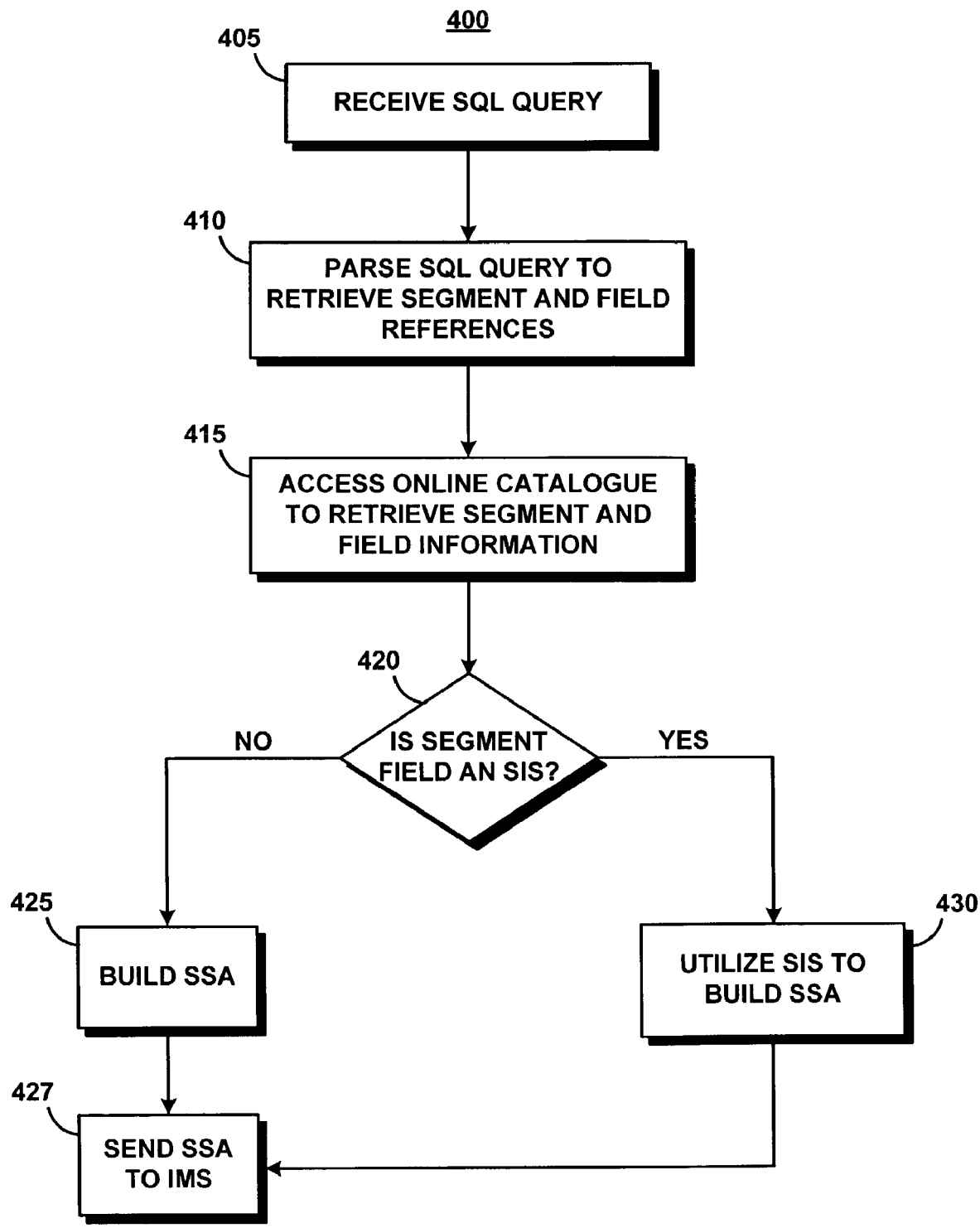
FIG. 4 is a process flow chart illustrating a method of operation of the secondary index and online catalogue system of FIGS. 1 and 2.

Method 400 of FIG. 4 illustrates the operation of system 10. With further reference to FIG. 1, the IMS JDBC® driver 25 receives an application request, such as an SQL query, from the JDBC® application program 20 at block 405, to access the database 35 from the application program.

The IMS JDBC® driver 25 parses the application request to retrieve segments and field references at block 410. In the present example, the IMS JDBC® driver 25 parses the application request (represented by link 500) to determine at least one column name and at least one table name.

At block 415, the IMS JDBC® driver 25 accesses the online catalogue 15 to retrieve segment and field information. At decision block 420, the IMS JDBC® driver 25 examines the retrieved segment information to determine if it is a secondary index segment. A field in the DLITypeInfo object for the field, identifies the retrieved segment information as a secondary index segment. If not, the IMS JDBC® driver 25 builds a segment search argument (SSA) for the application request 500 at block 425. The IMS JDBC® driver 25 then sends the secondary search argument to the information management system 30 (block 427).

If at decision block 420 the segment field is determined to be a secondary index segment, the IMS JDBC® driver 25 utilizes this secondary index segment to build a secondary search argument at block 430. The IMS JDBC® driver 25 then sends the secondary search argument to the information management system 30 (block 427). Process 400 repeats steps 420, 425, 427, and 430, as described herein, for each field in the SQL query that was parsed at block 410.

In the present example, the system 10 utilizes the online catalogue 15 containing metadata, to translate the column name to a field name and the table name to a segment name, with the segment name having an associated secondary index. The system 10 utilizes the online catalogue 15 to determine an associated secondary index name, and builds a database request that includes the segment name, the field name, and the associated secondary index name. The system 10 then sends the database request to the IMS JSBC® drive 25, so that the associated secondary index could be used by the database management system in response to the database request.

It is to be understood that the specific embodiments of the invention that have been described are merely illustrative of certain application of the principle of the present invention. Numerous modifications may be made to the system and method for providing a secondary index within an online catalogue invention described herein without departing from the spirit and scope of the present invention. Moreover, while the present invention is described for illustration purpose in relation to JDBC®, Java®, and IMS databases, it should be clear that the invention is applicable as well to other application program interface drivers for other programming languages such as C++ language, and can be applied to a database management system that does not have an online catalogue.

What is claimed is:

1. A method for identifying and utilizing at least one secondary index in order to efficiently access a hierarchical database in response to a relational application program request utilizing a database management system that is not provided with an internal catalog of online metadata, comprising:

receiving the relational application program request from an application program;

parsing the relational application program request to determine at least one column name and at least one table name;

utilizing an external online application catalog comprising metadata to translate the at least one column name and the at least one table name to a segment name that is associated with the at least one secondary index;

determining at least an associated secondary index name utilizing the external online application catalog;

building a database request comprising the segment name, the field name, and the associated secondary index name;

sending the database request to the database management system, wherein the database management system uses the at least one secondary index to prepare a response to the database request;

wherein the application program is a JAVA application; and wherein receiving the relational application program request comprises receiving the relational application program request through a JDBC application program interface.

2. The method of claim 1, wherein the relational application program request comprises an SQL query.

3. The method of claim 1, wherein the hierarchical database is an information management system hierarchical database.

4. A computer program product having instruction codes that are stored on a computer-readable medium, for identifying and utilizing at least one secondary index in order to efficiently access a hierarchical database in response to a relational application program request utilizing a database management system that is not provided with an internal catalog of online metadata, comprising:

a first set of instruction codes for receiving the relational application program request from an application program;

a second set of instruction codes for parsing the relational application program request to determine at least one column name and at least one table name;

a third set of instruction codes for translating the at least one column name and the at least one table name to a segment name that is associated with the at least one secondary index, utilizing an external online application catalog comprising metadata;

a fourth set of instruction codes for determining at least an associated secondary index name utilizing the external online application catalog;

a fifth set of instruction codes for building a database request comprising the segment name, the field name, and the associated secondary index name;

the fifth set of instruction codes sending the database request to the database management system, wherein the database management system uses the at least one secondary index to prepare a response to the database request;

wherein the application program is a JAVA application; and wherein the first set of instruction codes receives the relational application program request through a JDBC application program interface.

5. The computer program product of claim 4, wherein the relational application program request comprises an SQL query.

6. The computer program product of claim 4, wherein the hierarchical database is an information management system hierarchical database.

7. A system that identifies and utilizes at least one secondary index in order to efficiently access a hierarchical database in response to a relational application program request utilizing a database management system that is not provided with an internal catalog of online metadata, comprising:

means for receiving the relational application program request from an application program;

means for parsing the relational application program request to determine at least one column name and at least one table name;

means for translating the at least one column name and the at least one table name to a segment name that is associated with the at least one secondary index, utilizing an external online application catalog comprising metadata;

means for determining at least an associated secondary index name utilizing the external online application catalog;

means for building a database request comprising the segment name, the field name, and the associated secondary index name;

means for sending the database request to the database management system, wherein the database management system uses the at least one secondary index to prepare a response to the database request;

wherein the application program is a JAVA application; and wherein the relational application program request is received through a JDBC application program interface.

8. The system of claim 7, wherein the relational application program request comprises an SQL query.

9. The system of claim 7, wherein the hierarchical database is an information management system hierarchical database.

* * * * *